United States Patent [19]

Delajoud

[11] Patent Number: 5,331,838
[45] Date of Patent: Jul. 26, 1994

[54] DEAD WEIGHT PISTON DRIVE AND CONTROL SYSTEM

[76] Inventor: Pierre R. Delajoud, 109 Rue de Longchamp, 92200 Neuilly sur Seine, France

[21] Appl. No.: 985,848

[22] Filed: Dec. 3, 1992

[51] Int. Cl.⁵ .................... G01L 7/16; G01L 27/00
[52] U.S. Cl. ........................... 73/4 D; 73/745
[58] Field of Search .............. 73/4 D, 4 R, 4 V, 745; 177/201, 208

[56] References Cited

U.S. PATENT DOCUMENTS

| | | | |
|---|---|---|---|
| 1,581,624 | 4/1926 | Wunderlich et al. | |
| 3,133,435 | 5/1964 | Lewis | 73/4 |
| 3,272,014 | 9/1966 | Miks et al. | 73/4 D |
| 3,464,256 | 9/1969 | Lloyd | 73/4 |
| 3,472,059 | 10/1969 | Pruett et al. | 73/4 |
| 3,482,553 | 12/1969 | Buchwald | 123/55 |
| 3,545,278 | 12/1970 | Chandler | 73/4 D |
| 3,630,071 | 12/1971 | Newhail | 73/4 D |
| 3,728,905 | 4/1973 | Fell et al. | 74/220 |
| 3,888,217 | 6/1975 | Hisserich | 123/90.31 |
| 3,926,063 | 12/1975 | Mayfield | 74/242 |
| 3,977,266 | 8/1976 | Tantlinger | 74/242.11 |
| 4,674,335 | 6/1987 | Wendt | 73/745 |
| 5,025,654 | 6/1991 | Haefner | 73/4 D |

*Primary Examiner*—Donald O. Woodiel
*Attorney, Agent, or Firm*—Cahill, Sutton & Thomas

[57] ABSTRACT

An improved dead weight piston pressure measurement/calibration device includes a cylinder and a dead weight piston assembly that includes a piston rotatable and vertically in the cylinder, bell housing supported by the piston and carrying a number of calibration weights. The weight of the dead weight piston assembly initially is supported by an elastic stop device. Gas from an external source is rapidly forced into the cylinder until the dead weight piston assembly rises in an "elastic" zone defined by the elastic stop device. Such movement is sensed to "proportionally" reduce the rate of flow of gas and stabilize the position of the piston in the second element in a free-floating equilibrium condition, and actuate a drive mechanism that rotates the dead weight piston assembly and maintains the rotation rate in a defined range without producing any sustained vertical or radial displacement forces on the dead weight piston assembly, and thereby avoiding pressure overshoot.

24 Claims, 5 Drawing Sheets

DEAD WEIGHT PISTON DRIVE AND CONTROL SYSTEM

BACKGROUND OF THE INVENTION

The invention relates to a system for imparting precisely controlled spin to a piston of a dead weight piston pressure measurement/calibration device without unpredictably disturbing its free movement.

Dead weight piston pressure measurement/calibration devices are well-known. Such devices ordinarily include a piston supporting a selected number of calibration weights. A "dead weight piston assembly" includes the piston, a bell housing, and the calibration weights. The piston is slidably disposed in a cylinder, in very low frictional relationship to the cylinder. Fluid, which can be gas or liquid, the pressure of which is to be defined, is metered into the bottom of the cylinder so as to push the dead weight piston assembly upward. When the force produced on the bottom of the piston by the pressurized fluid equals the weight of the dead weight piston assembly, the dead weight piston assembly "floats" in an equilibrium condition.

In the closest prior art dead weight piston calibration devices, the piston usually supports a hollow, partially cylindrical bell housing that encloses the cylinder within which the piston is disposed. A horizontal annular flange or ledge is attached to and extends outwardly from a lower outer surface portion of the bell housing. The piston, bell housing, and annular weight assembly are very precisely and symmetrically shaped and balanced. A selected number of calibration weights are stacked on the ledge for the purpose of precisely establishing the total weight of the dead weight piston assembly. A spin is imparted to the dead weight piston assembly, which is sufficiently symmetrical about the vertical axis of the piston that the piston spins freely within the cylinder, the outer surfaces of the piston being separated and lubricated from the walls of the cylinder by a thin layer of fluid, which can be a gas or liquid. The known weight of the dead weight piston assembly and the known effective area of the "piston-cylinder" produce a precise indication of the pressure being supplied to support the dead weight piston assembly in a "free-floating" condition between upper and lower stops of the dead weight piston calibration device.

Those skilled in the art know that the best accuracy can be obtained in a dead weight piston pressure measurement system while the dead weight piston assembly is rotating in a free-floating equilibrium condition in a particular rotation rate range, with no interference from a rotational drive system or a rotation measuring device.

Prior dead weight piston pressure measuring systems typically impart spin to the piston assembly by means of an elliptical pulley driven by a constant velocity belt. Or, a flexible member momentarily engages the dead weight piston assembly to accelerate it, but also causing vertical "bouncing" of the piston which results in pressure perturbations. The times at which this happens are unpredictable. Consequently, the measured pressure data contains corresponding unpredictable perturbations. Other prior systems reduce the pressure beneath the free floating rotating piston to lower it enough to cause it to engage a drive clutch and accelerate the piston rotation rate to the desired maximum value. Other prior systems are completely manual, depending on operator observation of piston rotation rate and manual turning on of the drive motor to accelerate the piston. These prior systems are not well suited to rapid, accurate, automated pressure measurement/calibration operations.

The centering of the piston in the cylinder is influenced by the rotation speed of the piston. Consequently, there is a slight dependance of the effective area of the piston-cylinder on piston rotation speed. In order to improve the reproduceability of a dead weight piston measurement, it is necessary to maintain the rotation speed of the piston within defined limits.

Thus, there is an unmet need to provide a drive system with a means of maintaining the rotation speed of the piston within predetermined range.

A problem with such prior dead weight piston calibration devices is that it previously has not been possible to impart adequate spin to the dead weight piston assembly without causing piston motion perturbations due to permanent or momentary contact of the piston with the piston drive mechanism. Such perturbations obviously reduce the accuracy of the pressure measurement or calibration being performed. In prior dead weight piston calibration devices in which the piston drive system automatically engages and accelerates rotation of the piston, the precise moment or instant of engagement are indeterminate, so the moment or instant of occurrence of the above mentioned perturbations also are indeterminate, and there is no basis for reviewing when the pressure data is inaccurate because of the perturbations.

Accordingly, there is an unmet need for an improved dead weight piston pressure measurement or calibration device that is more accurate than those of the prior art.

More specifically, there is an unmet need to eliminate inaccuracy in a dead weight piston measurement or calibration device due to "random" vertical force components applied to a piston thereof in the course of causing the piston to rotate while in a free-floating condition.

Another unmet need of the art is to eliminate unpredictability of the times at which the piston drive mechanism engages the rotating piston assembly to accelerate it.

SUMMARY OF THE INVENTION

Accordingly, it is an object of the invention to provide a dead weight pressure measurement/calibration device that is more accurate than those of the prior art.

It is another object of the invention to provide a system for imparting spin to the dead weight piston assembly of a dead weight pressure/calibration device without reducing the accuracy of the pressure measurement or calibration being performed thereby.

It is another object of the invention to provide an improved dead weight piston pressure measurement/calibration device which imparts spin to the dead weight piston assembly without imparting to it vertical perturbations that interfere with the accuracy of the pressure measurement or calibration being performed.

It is another object of the invention to rapidly achieve equilibrium of the piston in a dead weight piston measurement system while avoiding pressure "overshoot" on "undershoot", and avoiding errors in characterization of the hysteresis of a device under test due to such pressure overshoot or undershoot.

It is another object of the invention to provide an improved dead weight piston measurement/calibration device in which piston rotation speed is precisely measured and controlled regardless of the vertical position of the piston.

It is another object of the invention to avoid unpredictable interruptions and perturbations in the measurement of pressure of a dead weight measuring system caused by unpredictable engagement of the rotating dead weight piston by an automated drive system.

It is another object of the invention to provide a dead weight pressure measurement/calibration device in which the gap at the interface area between a piston and its cylinder can be adjusted.

Briefly described, and in accordance with one embodiment thereof, the invention provides an improved dead weight piston pressure measurement/calibration device and technique including a cylinder and a dead weight piston assembly. The dead weight piston assembly includes a piston rotatable in the cylinder and vertically moveable in the cylinder, a bell housing supported by the piston and carrying a ledge supporting a selected number of calibration weights. (In another embodiment of the invention the piston is stationary, and the cylinder rotates about the piston, and the bell housing is supported by the cylinder and carries a ledge supporting a selected number of calibration weights.) The weight of the dead weight piston assembly initially is supported by an elastic stop or displacement limiting device. Gas from an external source is rapidly metered into the volume defined by the cylinder and the piston until the dead weight piston assembly begins to rise. Movement of the dead weight piston assembly is sensed to produce a control signal that is applied to control the gas source to substantially reduce the rate of flow of gas between the volume defined by the cylinder and the piston and the gas source. A control signal is used to actuate a drive mechanism that imparts spin to the dead weight piston assembly. The flow of gas is controlled in response to the control signal to stabilize the position of the piston in the cylinder in a free-floating condition. The drive mechanism includes three pulleys rotating in response to the control signal. The pulleys support a drive belt in an equilateral triangular configuration such that the belt surrounds but does not touch a cylindrical drive surface of the dead weight piston assembly. The cylindrical drive surface is coaxial with the piston. In response to the control signal, three idle wheels symmetrically engage the outer surface of the belt, displacing it inward, causing it to engage three points, which are angularly spaced 120 degrees apart, on the cylindrical drive surface to impart the spin to the dead weight piston assembly without producing any prolonged vertical displacement forces that influence a pressure measurement or calibration operation being performed. An elastic stop assembly connected between the piston and cylinder limits vertical movement of the piston beyond an "equilibrium zone" in which the piston is in a "free floating" condition. Vertical displacement of the dead weight piston through the equilibrium zone is sensed. The elastic stop assembly defines an "elastic stop zone" in which the elastic stop assembly is elastically deformed by vertical displacement of the piston relative to the cylinder, and the vertical displacement of the piston relative to the cylinder is sensed in order to produce a "proportional control signal" indicative of the piston position relative to the elastic stop zone. The proportional control signal is used to reduce the rate of pressure change of gas supplied by the gas source as the piston moves toward the equilibrium zone, to thereby stabilize the piston and equilibrium zone without pressure overshoot. The speed of rotation of the piston relative to the cylinder is sensed to control engagement of the belt to accelerate the rotation rate of the piston to a desired upward limit and to produce a ready signal that indicates when pressure data is valid.

DETAILED DESCRIPTION OF THE PREFERRED EMBODIMENTS

Figure 1:
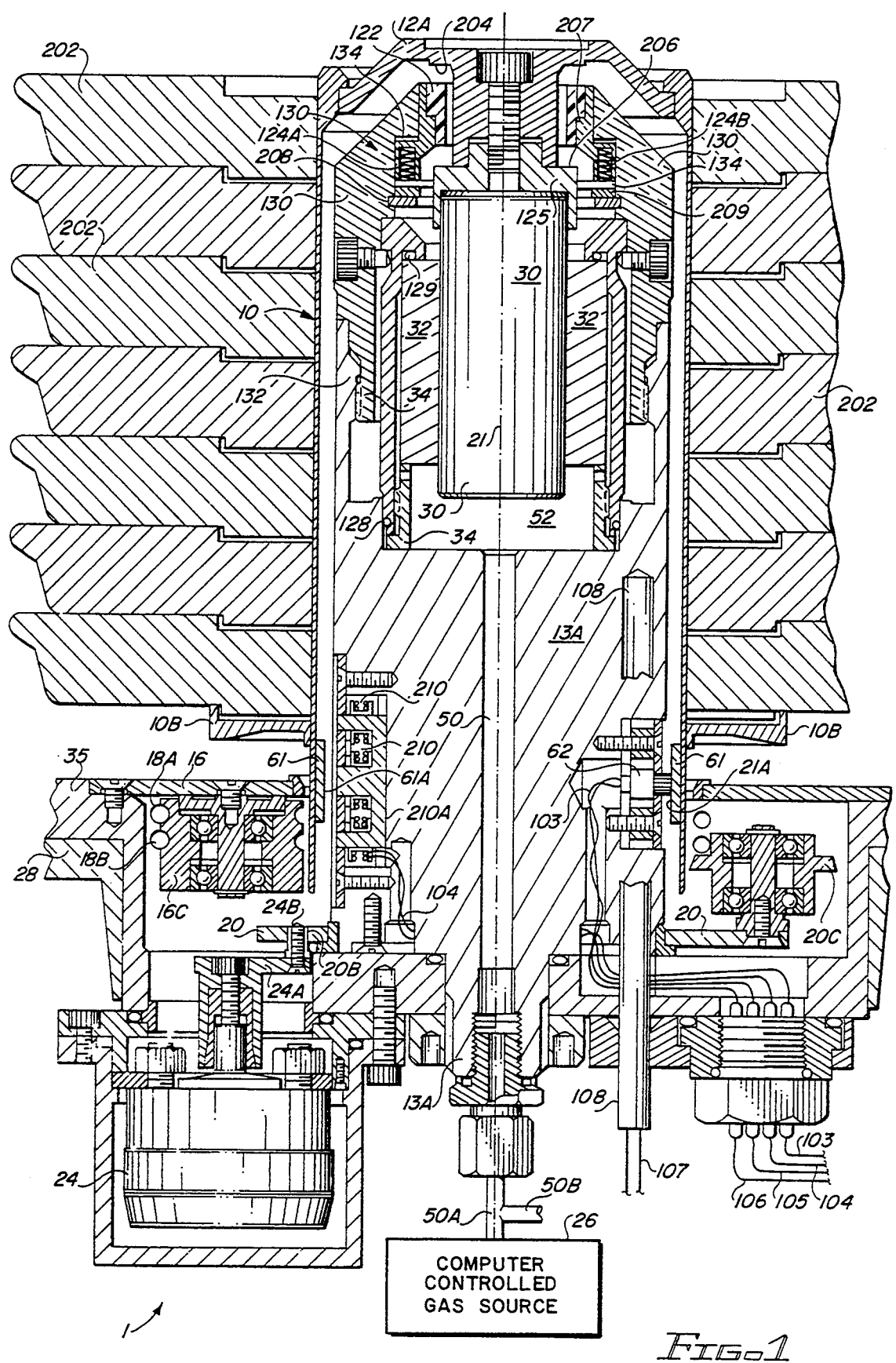
FIG. 1 is a detailed sectional view of the dead weight piston assembly of the present invention.
Figure 2:
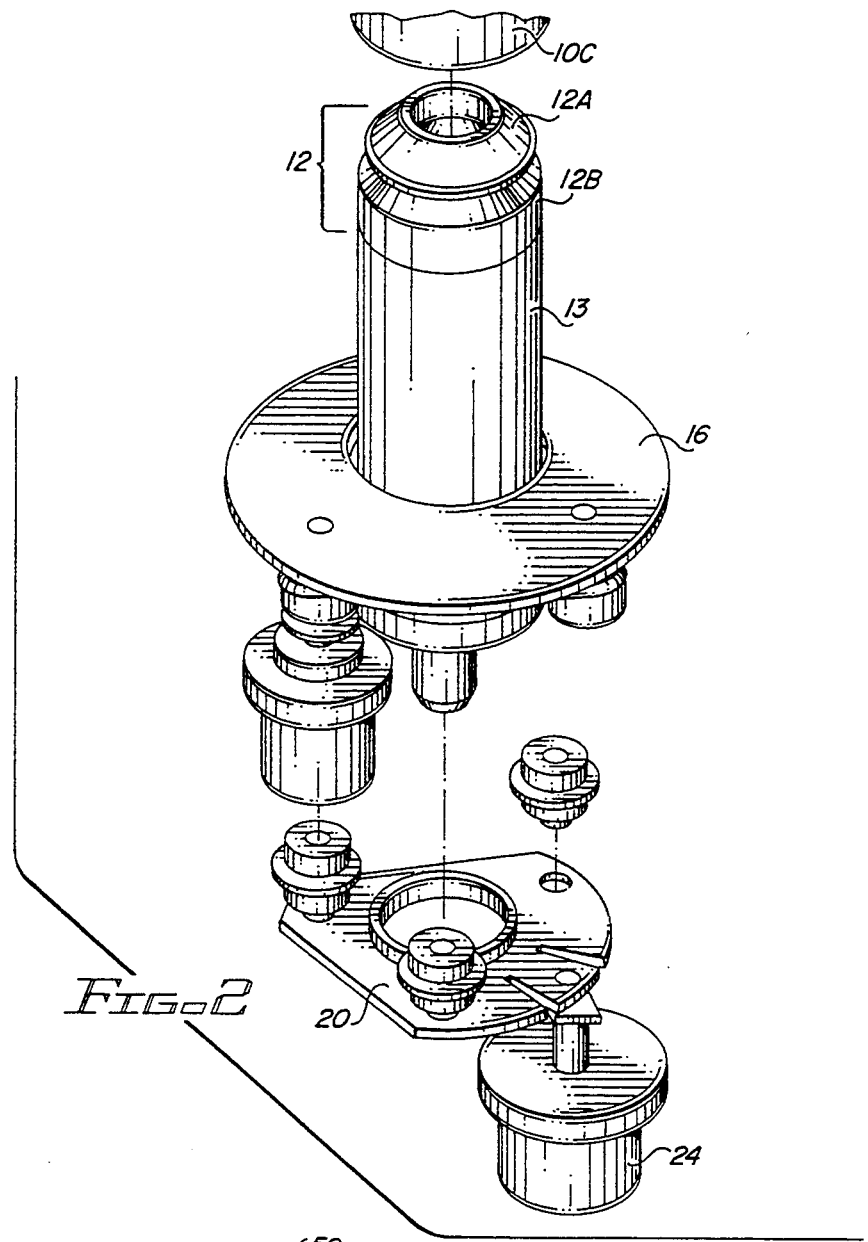
FIG. 2 is an exploded isometric view of the dead weight piston assembly of FIG. 1.

Referring to FIG. 1, a detailed section view diagram of the dead weight piston pressure measuring device 1 of the present invention, and FIG. 2, which shows an exploded view of some of the components thereof are shown. The inner portion of metrological assembly 12 (FIG. 2) is shown in detail in FIG. 1. It includes a cylindrical ceramic piston 30 disposed in a ceramic cylinder 32. Gas, the pressure of which is being measured or calibrated, is fed through a tube 50 from an external source such as a computerized pressure control system 26, into a volume 52 bounded by the bottom portion of cylinder 32, the bottom surface of piston 30, and the top surface of a base 13A through which tube 50 extends. A number of precision annular calibration weights 202 can be slid over a bell housing 10 and rest on ledge 10B of bell housing 10 in precisely centered relation thereto.

Metrological assembly 12 also includes seal element 34 and O-rings 128 and 129 which support ceramic cylinder 32 in sealed relationship to the base 13A through which tube 50 extends.

Two sets 124A and 124B of springs, each set including four springs, and a spring carrier 207 constitute a lower spring-loaded elastic stop and an upper spring-loaded elastic stop that limit the upward and downward movement of a dead weight piston assembly which includes piston 30, piston cap 12A, piston head 125, bell housing 10, and a stack of calibration weights 202.

Each individual spring 124A and 124B is carried in a spring carrier 207 and is held therein by a stop ring 209, which is held in place by a clip ring 208. The four springs 124A of the first set are symmetrically positioned 90 degrees apart about the vertical axis 21. The four springs of the second set also are disposed symmetrically 90 degrees apart relative to vertical axis 21, such that the eight springs are symmetrically located 45 degrees apart around spring carrier 207. The four springs 124A are disposed in four holes in the bottom of spring carrier 207, and abut retaining ring 209, which is held in place relative to retaining nut 130 by clip ring 208. The four springs 124B are disposed in four holes in the upper portion of spring carrier 207 and abut a horizontal upper shoulder of retaining nut 130.

Retaining nut 130 is screwed into the threads of bore 132 of body 13A of the mounting post and retains the assembly of parts that constitute the metrological element 12 (i.e., the piston-cylinder assembly) of the system.

The elastic stop assembly 124 including spring carrier 207 and the opposed sets of springs 124A and 124B operate to limit the vertical movement of the dead weight piston assembly and thereby determine an intermediate free-floating region, which in the described embodiment is approximately ±4 millimeter in height. Springs 124A exert an upward bias on spring carrier 207, and springs 124B exert a downward bias force on spring carrier 207. Spring carrier 207 is engaged by Teflon ring 122.

There is a dead volume 134 between spring carrier 207 and the above mentioned shoulder surface of retaining nut 130. The dead volume 134 increases or decreases as a result of following vertical movement of spring carrier 207, relative to their equilibrium positions under the effect of the opposing sets of springs 124A and 124B. When the dead volume 134 changes, the air contained therein escapes along guide surfaces of spring carrier 207 and retaining nut 130 to form a gas shock absorber. In the case of sudden overpressure or underpressure in volume 52, this arrangement limits the shock between the piston head 125, piston cap 12A, and also limits the shock between the spring carrier 207 and retaining nut 130.

Teflon ring 122 minimizes friction in the case of contact between the rotating piston head 125 and surface 206 of rotating piston cap 12A and surface 204 thereof. Teflon ring 122 also avoids sticking of the abutting surfaces when the assembly including piston 30 moves from the high or low stop positions to its free-floating equilibrium position.

It should be noted that it is not the precise configuration of dead weight piston 30, cylinder 32, or the seal mechanism 34 to which the novelty of the present invention is mainly directed, but to the subsequently described drive apparatus which imparts rotation to the bell housing 10 to which dead weight piston 30 is attached by piston cap 12A and piston head 125, and the subsequently described control apparatus and control techniques, including the rotation speed measurement technique and the shock absorbing elastic stop assemblies described above.

The above-mentioned computer controlled gas source 26 can be the device described in U.S. Pat. No. 5,142,483, application Ser. No. 514,659, entitled "PRESSURE REGULATING SYSTEM FOR POSITIVE SHUT-OFF PRESSURE CONTROLLER", issued on Aug. 25, 1992, and incorporated herein by reference.

It should be noted that any friction between the outer walls of piston 30 and the inner wall of cylinder 32 will introduce errors in the pressure measurement. To avoid this, the dead weight piston measurement/calibration device of the present invention operates to impart a rotation in the range of roughly 30 to 60 rpm to bell housing 10 immediately after the dead weight piston assembly has been lifted just enough by the pressure of gas forced by computer controlled gas source 26 through tube 50 into volume 52 that abutment surface 204 of piston cap 12A no longer rests on the top surface of Teflon ring 122.

In operation, computer controlled gas source 26 is first operated to rapidly force gas through tube 50 into chamber 52 until the pressure in chamber 52 is nearly enough to lift piston 30, causing it to lift piston head 125 and piston cap 12A and thereby lift bell housing 10 and calibration weights 202.

The transition of the dead weight piston assembly from an initial condition in which it is restrained by the elastic stop assembly into the free-floating region occurs gradually, because springs 124A and 124B are compressed to a different degree when the weight of the dead weight piston assembly, all of which is concentrated on abutment surface 204, rests on Teflon ring 122. (When piston 30 is in the free-floating equilibrium zone, springs 124A and 124B are equally compressed.) The surface 204 of piston cap 12A initially rests on Teflon ring 122 because the pressure in volume 52 is not initially enough to lift the weight of the dead weight piston assembly 30 minus the difference of the upward force and the downward forces exerted by the two sets of stop springs 124A and 124B.

As the pressure in volume 52 approaches the level that will support the dead weight piston assembly, springs 124A gradually expand and springs 124B gradually compress until spring carrier 207 is in equilibrium between the two spring sets and the dead weight piston assembly is in free-floating equilibrium and is supported only by the gas in volume 52. If the pressure in region 52 is increased much above the level required to maintain piston 30 in a free-floating condition in cylinder 32, the abutment surface 206 of piston head 125 is lifted enough that it engages the bottom surface of Teflon ring 122. The intermediate region between engagement of the piston assembly with the lower elastic stop and the upper elastic stop is the above-mentioned "free-floating" region.

If the gas pressure in volume 52 is precisely maintained such that the dead weight piston assembly remains in the free-floating condition while rotating in the range between 30 and 60 rpm, then a very precise pressure measurement or pressure calibration result is obtained, since the combined weight of calibration weights 202 and the other parts of the dead weight piston assembly are precisely known.

Figure 3A:
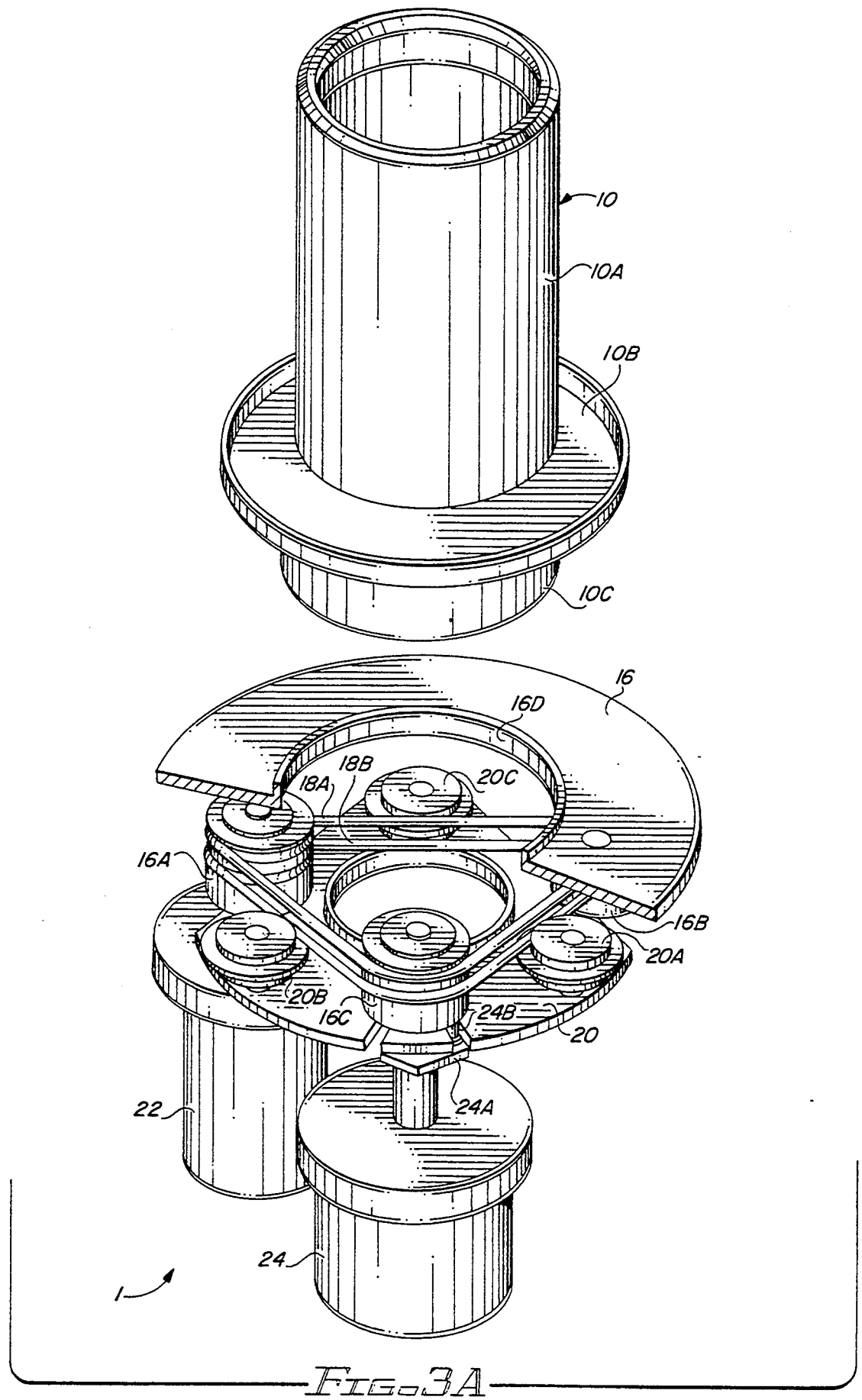
FIG. 3A is an exploded isometric view illustrating the bell housing drive system of the present invention in an idle configuration.

Referring to FIGS. 1, 2, and 3A, a fixed support plate 16 has three pulleys 16A, 16B, and 16C rotatably mounted on its bottom surface in symmetrical (120 degrees apart) locations. An upper belt 18A and a lower belt 18B engage the three pulleys 16A, 16B, and 16C which are supported in an equilateral triangular configuration on a stationary support plate 16. Pulley 16A is a drive pulley, and pulleys 16B and 16C are idle pulleys. Drive pulley 16A is driven by a DC motor 22.

Figure 3B:
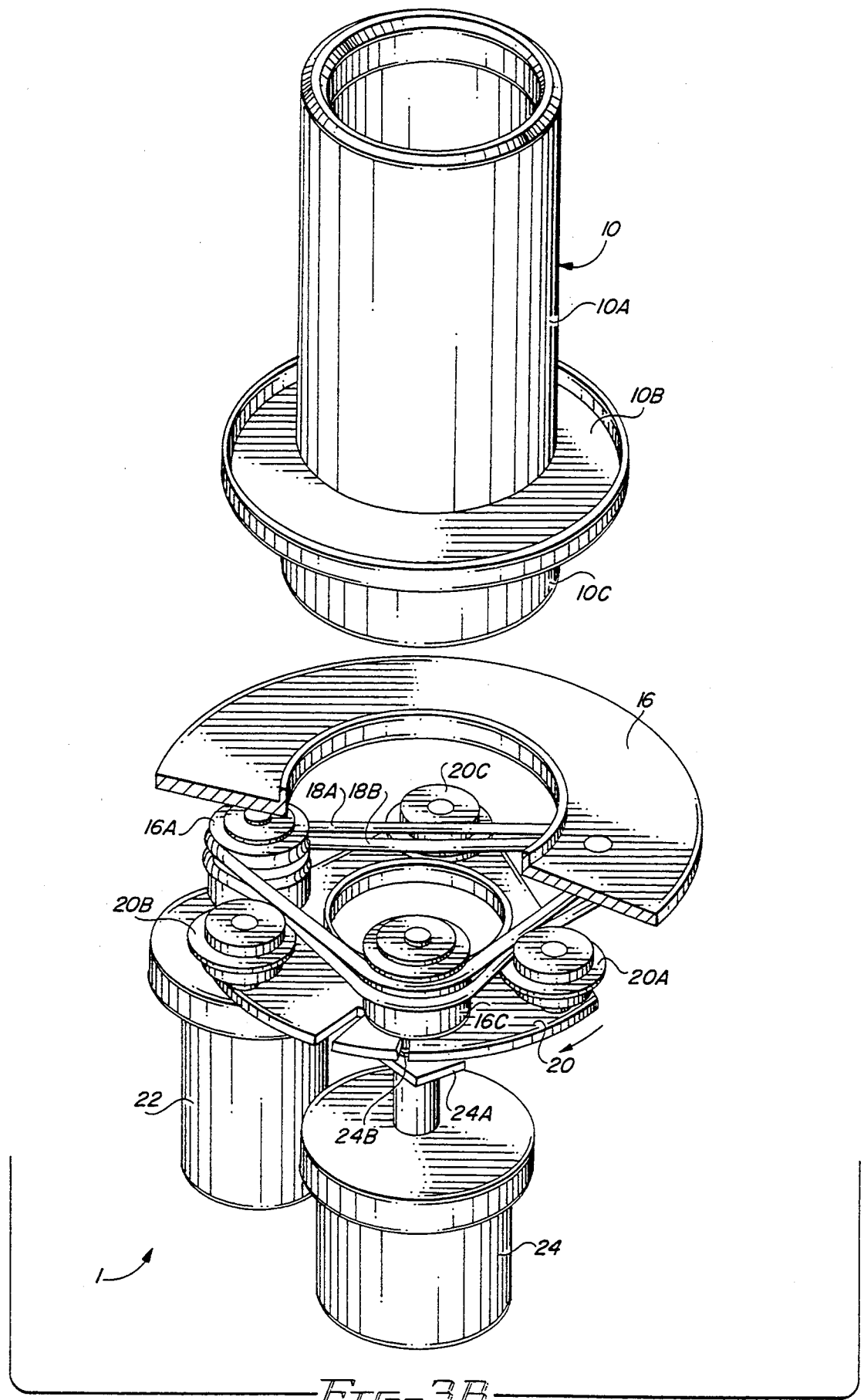
FIG. 3B is an exploded isometric view of the drive system shown in FIG. 3A configured to produce engagement with and drive to the bell housing of the dead weight piston assembly of FIG. 1.

As shown in the partially exploded views of FIGS. 3A and 3B, the lower portion 10C of bell housing 10 extends through a hole 16D of fixed support plate 16 so that the drive belts 18A and 18B are located outside of the surface of bottom section 10C of bell housing 10. In the un-actuated configuration shown in FIG. 3A, neither of belts 18A or 18B touches the cylindrical drive surface 10C.

FIGS. 1, 2, 3A and 3B show a lower rotatable support plate 20 on which three symmetrically located (120 degrees apart) idle pulleys 20A, 20B and 20C are mounted. Support plate 20 can be rotated by an actuator 24 which drives a cam arm 24A having a peg 24B thereon. If arm 24A rotates counter-clockwise from the configuration shown in FIG. 3A to the configuration shown in FIG. 3B, support plate 20 rotates clockwise a corresponding amount. (Preferably, bell housing 10 rotates in the opposite direction, i.e., counter-clockwise, to the direction of rotation of plate 20, for best performance.) This causes the positions of idle pulleys 20A, 20B, and 20C to also rotate so that they symmetrically engage the three equal segments of lower belt 18B, deforming it as shown in FIG. 3B. The deformations of lower belt 18B are sufficient to cause it to symmetrically engage three points (located 120 degrees apart) of the cylindrical drive surface 10C of bell housing 18, imparting spin to it.

An advantage of this arrangement is that the forces at the three contact points of belt 18B with surface 10C impart no resulting sustained radial or vertical force component to bell housing 10 as it spins.

The rotation rate of motor 22 is set to correspond to the maximum rotation rate of bell housing 10, for example, 60 rpm, before lower belt 18B is caused to engage section 10C of bell housing 10, in order to prevent any slowing of bell housing 10 at the moment of belt engagement. When the subsequently described rotation rate measurement indicates that bell housing 10 has reached 60 rpm, lower belt 18B is disengaged from bell housing surface 10C, and the motor 22 is stopped by the microprocessor based control system 100 subsequently described with reference to FIG. 4. The amount of time needed to increase the bell housing rotation speed from it's minimum of 30 rpm to it's maximum rate of 60 rpm is only a few seconds, so the operating time of motor 22 is very short. Therefore, no parasitic heating is produced as for traditional drive systems in which the motor runs permanently or semi-permanently.

It should be noted that the minimum and maximum rotation speeds of 30 and 60 rpm can be changed by reprogramming the microprocessor to correspond to the size of the piston and the type of fluid being used in order to obtain optimum performance.

After bell housing 10 has reached the desired speed of approximately 60 rpm, actuator 24 rotates plate 20 and idle pulleys 20A, 20B, and 20C in the opposite direction, disengaging lower belt 18B from surface 10C of bell housing 10, allowing it to "coast" in an essentially frictionless free-floating condition, supported only by the gas in volume 52. Free rotation of the dead weight piston assembly is maintained by the inertia of the structure (including calibration weights 202) while the spinning assembly is in the above-mentioned free-floating condition.

It should be understood that the computer controlled gas source device 26 has the capability of incrementing increases in pressure in volume 52 in both very minute increments and very large increments, as described in the above commonly assigned patent. If the pressure in volume 52 is increased in very minute increments, a great deal of time is required to increase the pressure in volume 52 to a level that lifts the dead weight piston assembly gradually into the free-floating position without pressure "overshooting" that would result in abutment surface 206 of piston head 125 abutting the bottom of Teflon ring 122.

This would be undesirable because the external device being calibrated usually has mechanical hysteresis, so "overshooting" or "undershooting" of the pressure in it causes mechanical deformations which, because of the hysteresis, are not perfectly elastic. The material of the device 59 under test (See FIG. 4) does not proportionately return to it's previous configuration as the overshoot or undershoot in pressure is corrected. Consequently, characterization of the hysteresis (which usually is being determined) is inaccurate.

What is desired is for the external computer controlled gas source 26 to be able to rapidly pressurize volume 52 to a pressure slightly below (or above) what will be required to lift (or lower) the dead weight piston assembly into its free-floating condition, and then increase (or decrease) the pressure in extremely minute increments until the free-floating equilibrium condition of the piston is accomplished, without any such overshooting (or undershooting).

Figure 4:
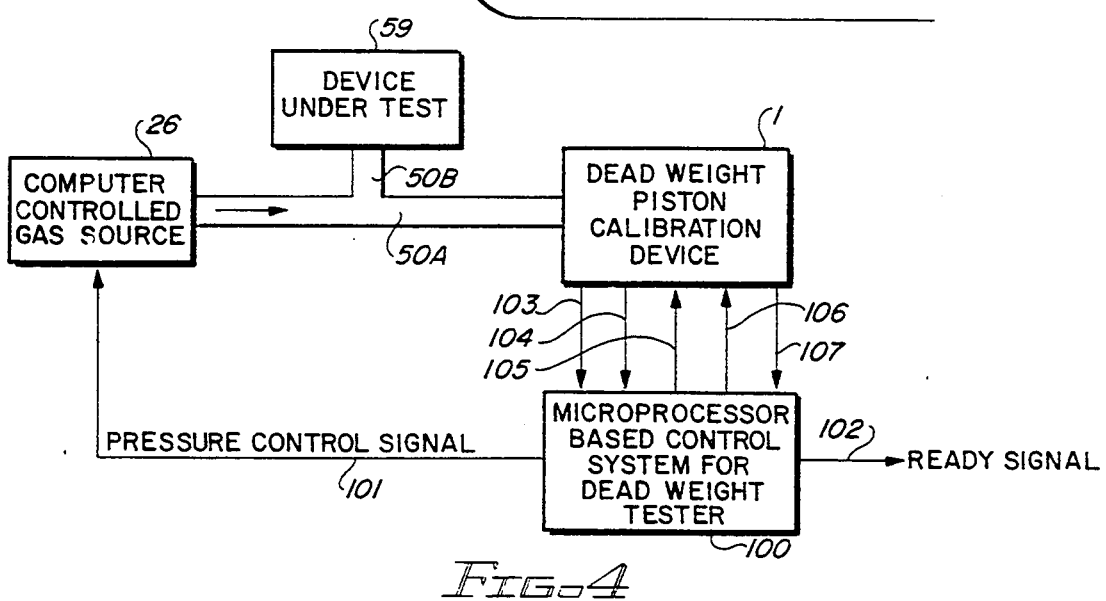
FIG. 4 is a block diagram illustrating the connection of the dead weight piston assembly of FIG. 1 to a computerized pressure control device and an electronic control circuit.

When bell housing 10 is lifted or lowered slightly, ferromagnetic ring 61 induces voltages representing the vertical movement of the dead weight piston assembly in two linear variable differential transformers (LVDTs), mounted on opposite sides of mounting post 13A. (Although only one LVDT 210A is shown, two are preferably used to obtain an average output signal that is unaffected by slight off-center portions of bell housing 10.). Wires 104 leading from three coils 210 on E-shaped ferrite elements in LVDTs 210A carry signals indicating the position of ferromagnetic ring 61 relative to coils 210. Such signals are measured by external electronics in microprocessor based control system 100 (FIG. 4). In response to the induced voltages, microprocessor based control system 100 sends a "proportional" pressure control signal 101 to computer controlled gas source 26 as soon as piston 30, bell housing 10, and calibration weights 202 are lifted slightly.

Equally spaced vertical optical grooves or notches (not shown) are disposed on the inner surface of ferromagnetic ring 61 (FIG. 1), which is attached to the lower interior surface of bell housing 10. The rotation rate of piston 30 is sensed by optical sensor 62, which includes a light emitting diode that directs light at the equally spaced vertical optical grooves or notches on the inner surface of ferromagnetic ring 61 and a photosensor that senses light reflected from the optical grooves. The signals produced by the photosensor are transmitted by conductor 103 to microprocessor based control system 100, which measures the amount of time between such signals and from that computes the rotation speed of bell housing 61 and piston 30. The above described drive system is actuated when the measured piston rotation speed falls below 30 rpm, accelerating the piston rotation rate to 60 rpm and then disengaging the drive system and causing the ready signal 102 to be a logical "1" after a suitable amount of time has been allowed for pressure perturbations due to the piston perturbations to settle.

FIG. 4 shows a block diagram including the dead weight piston calibration device 1 of FIG. 1, computer controlled gas source 26, and microprocessor based control system 100. Dead weight piston calibration device 1 sends piston rotation speed information via a pair of conductors 103 to control system 100 and also sends information via the pair of conductors 104 thereto indicating the vertical position of piston 30 in cylinder 32. Control system 100 uses this information to send a drive motor power control signal via conductor 105 to drive motor 22 (FIG. 3A) and a control signal 106 to actuator 24.

Microprocessor control system 100 also produces "proportional" pressure control signal 101 in accordance with the difference between the pressure in volume 52 necessary to hold piston 30 in the free-floating zone and the actual pressure corresponding to the difference between the upward and downward compression forces exerted by opposed sets of springs 124A and 124B. Microprocessor control system 100 also produces a ready signal 102 when perturbations of piston 30 due to engagement with the lower belt 18B have been allowed enough time to settle, so no erroneous pressure data is sampled.

In the embodiment of FIG. 1, numeral 108 designates a platinum temperature probe which measures the temperature of base 13A. This information is carried by conductors 107 to microprocessor base control system 100 and used in the computation of pressure by adjusting the effective area of dead weight piston and cylinder assembly 30,32 in accordance with the temperature.

The effect of the difference of the upward and downward spring compression of the two opposed sets of springs 124A and 124B is to cause slightly less lifting of bell housing 10 and piston 30 by pressure increase in volume 52 than is required to produce free-floating equilibrium of the dead weight piston assembly. Proportional pressure control signal 101 causes computer controlled gas source 26 to stop the rapid increases in pressure in volume 52 and begin increasing the pressure therein by increments which decrease proportionally to the difference of the upward and downward compression forces of springs 124A and 124B until the piston assembly attains the free-floating equilibrium condition, avoiding any risk of overshooting. An extremely precise pressure measurement corresponding to the total free-floating, rotating weight then is obtained. The gas source 26 supplying the now precisely known pressure in volume 52 or the external test device 59 then can be calibrated accurately.

In accordance with the present invention, the signals 104 which indicate the position of piston 30 in its vertical ±5 millimeter "stroke", in combination with the elastic stop systems described above in which the springs 124A and 124B expand and compress, cause the pressure control signal 101 to be perfectly proportional to the pressure defined by the difference between the upward and downward compression forces of the two sets of limit springs 123A and 123B. This proportionality provides advance information to microprocessor based control system 100, allowing it to predict precisely when piston 30 leaves either the upper elastic stop zone or a lower elastic stop zone and enters into it's free-floating ±4 millimeter equilibrium zone. This advance warning allows microprocessor control system 100 to produce proportional pressure control signal 101 to slow the rate of change of pressure supplied by computer controlled gas source 26 as the rotating piston 30 undergoes the transition from an elastic stop zone into the free-floating equilibrium zone. This allows optimum high speed pressure calibration/testing operation without any danger of pressure overshooting or undershooting, and therefore avoids the above-mentioned disadvantages os such overshooting and undershooting.

It should be noted that the tolerances of the outer surface of piston 30 and the surface of cylinder 32 are so precise that the combined effect of the presence of a thin layer of gas between them, the spinning of the free-floating, precisely balanced dead weight piston assembly, and the above technique for controlling the incrementing of pressure supplied to volume 52, results in a faster, more precise calibration of computer-controlled gas source 26 than has been previously achieved.

If the selected test pressure point must be maintained for a long period of time, every time the piston rotation speed measured by the optical system which includes optical sensor 62, vertical position conductors 103, and a grooved optical surface on the inner side of ferromagnetic ring 61, falls below a certain limit, the piston rotation speed is increased by microprocessor based control system 100 back to it's maximum value (i.e. 60 rpm) and then released. This process is repeated as long as a particular constant pressure is to be maintained. During the increases in the rotation speed by the drive system, the "pressure ready" signal 102 is at a "0" level until the proper piston rotation speed has been reestablished. The pressure ready signal 102 indicates to the user that pressure data should not be sampled until the pressure ready signal 102 is a "1" and perturbations caused by activation of the piston drive system have settled, and until the piston rotation rate is with an acceptable range.

To summarize, the above-described system (1) allows rapid changes of pressure in volume 52 until the pressure in volume 52 is close to the pressure needed to achieve free-floating of the dead weight piston assembly, (2) senses initial slight lifting of piston 30 and weight 202 within the "elastic" range of the springs 124A and 124B, (3) then signals computer controller gas source 26 to increase the pressure in small, slow, precise increments in volume 52 until free-floating of the dead weight piston assembly is achieved, (4) then imparts spin to the free-floating dead weight piston assembly, and (5) after disengagement of the rotational drive system from the dead weight piston assembly and allowing time for the resulting perturbations to settle, produces a "ready" signal indicating the pressure data is accurate. Extremely precise calibration or measurement of the pressure supplied by the gas source is thereby achieved. Previously unachievable measurement of pressure automatically, without perturbations in the pressure data, are achieved with dead weight piston rotation within an optimum operating range. Pressure overshooting or undershooting is eliminated, and more accurate quantification of hysteresis characteristics of the device under test are thereby achieved.

It should be noted that the combination of the rotational drive system, the detection of the position of piston 30 and the rotational speed measurement system functions as well for measurements of gauge pressure as for measurements of absolute pressure. All of the foregoing description of the preferred embodiment has been for gas, but applies in precisely the same way to a system using oil or other liquid as the pressure transmitting medium. The above description also assumes that the piston rotates and the cylinder is static, but the invention is equally applicable to an embodiment of the invention wherein the piston is static and the cylinder is rotated.

Figure 5:
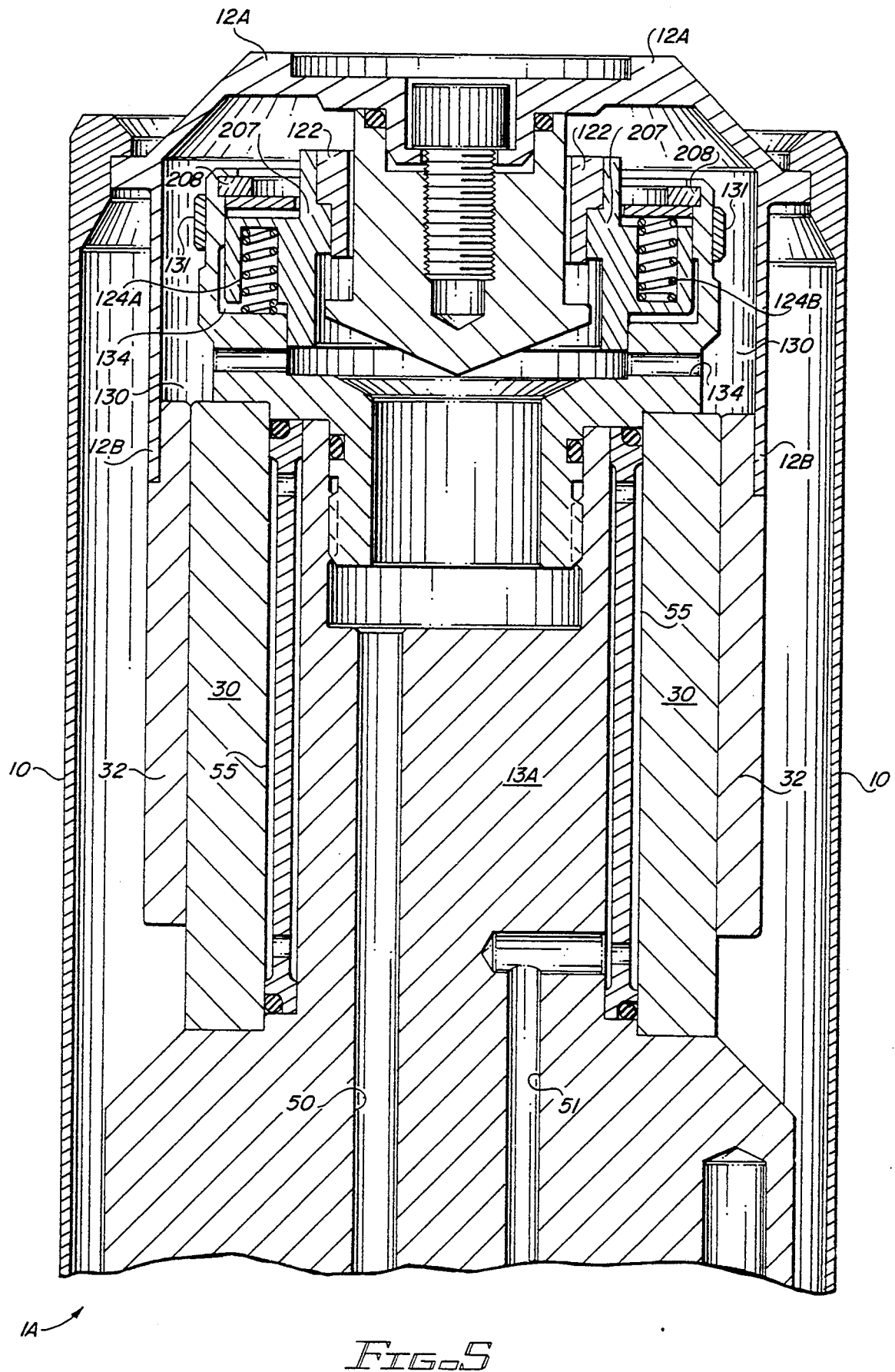
FIG. 5 is a detailed sectional view of an alternate embodiment of the invention.

FIG. 5 shows a section view of an alternate "dead weight cylinder" embodiment 1A of the invention in which piston 30 is stationary, supported by base 13A in essentially the same manner that cylinder 32 is supported by base 13A in the embodiment of FIG. 1. Note that in FIG. 5 the same reference numerals are used as in FIG. 1 to designate corresponding or analogous parts. In FIG. 5, cylinder 32 rotates about stationary piston 30, wherein the bell housing 10 and calibration weights 202 (not shown) are supported by rotating cylinder 32. Rotating cylinder 32 supports flange 12B of cylinder cap 12A, and cylinder cap 12A supports rotary bell housing 10, which is actuated by the drive system in precisely the same manner as in the embodiment of FIG. 1. Vertical displacement and rotational movement of rotary bell housing 10A are sensed in precisely the same manner as in the embodiment of FIG. 1. The elastic stop mechanism in FIG. 5 is entirely analogous to that in the embodiment of FIG. 1.

An additional feature of the embodiment of FIG. 5 includes provision of passage 51 in base 13A leading to a shallow gap 55 between the inner surface of piston 30 and the outer surface of base 13A. The gas pressure in passage 51 can be precisely controlled to cause expansion of the outer surface of piston 30 and thereby precisely control the gap between the outer surface of stationary piston 30 and the inner surface of rotating cylinder 32 by elastic deformation of piston 30. This can be advantageous in conveniently adapting the dead weight cylinder pressure measurement/calibration system 1A of FIG. 5 to perform optimally with various gases and/or liquids. This capability can reduce the need for extremely high precision in machining the tolerances of the emitting surfaces of cylinder 32 and piston 30. Another advantage of the embodiment of FIG. 5 is that the amount of surface area which is multiplied by the pressure supplied by the computer controlled gas source 26 (FIGS. 1 and 4) is substantially larger than in the embodiment of FIG. 1, allowing for greater accuracy in the dimensional determination of the effective area of the piston and cylinder. A plastic ring 131 the same outside diameter as piston 30 allows alignment of cylinder 32 with piston 30 to achieve convenient assembly of cylinder 32 onto piston 30, without damaging the inner surface of cylinder 32.

Although the terms "dead weight piston pressure measurement system" and "dead weight cylinder pressure measurement system" have been used herein, these two types of devices are analogous, and statements pertaining to one are generally applicable to the other.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A dead weight piston pressure measurement device, comprising in combination:
   (a) a cylinder;
   (b) a piston rotatable in the cylinder, and vertically moveable in the cylinder, the piston supporting a plurality of calibration weights and a cylindrical drive surface coaxial with the piston;
   (c) an external fluid source coupled to supply a flow of fluid, the pressure of which is to be measured or calibrated, into or out of a volume between the cylinder and the piston to vertically move the piston in the cylinder, the combined weight of a dead weight piston assembly including the piston and the calibration weights accurately indicating the pressure of the fluid in the volume when the piston is in a free-floating equilibrium condition in the cylinder;
   (d) a drive mechanism for rotating the piston, including
      i. first, second, and third stationary pulleys supporting a first belt in an equilateral triangle configuration, midpoints of first, second, and third segments of the first belt nearly touching first, second, and third points of the cylindrical drive surface,
      ii. drive means for rotating the first pulley, thereby rotating the first belt and thereby rotating the second and third pulleys,
      iii. first, second, and third moveable idle wheels symmetrically disposed adjacent to the first, second, and third segments of the first belt, and
      iv. means for moving the first, second, and third idle wheels against the first, second, and third segments of the first belt, respectively, displacing them inwardly to symmetrically engage three points of the cylindrical drive surface, respectively, causing the dead weight piston assembly to rotate without producing thereon any sustained vertical displacement forces.

2. The dead weight piston pressure measurement device of claim 1 including means for sensing vertical displacement of the dead weight piston assembly and producing a control signal to reduce a rate of pressure change of fluid supplied by the fluid source to stabilize the piston in the free-floating condition in the cylinder between an upper stop and a lower stop.

3. The dead weight piston pressure measurement device of claim 1 including an elastic stop assembly connected between the piston and the cylinder limiting vertical movement of the dead weight piston assembly beyond an equilibrium zone in which the piston is in the free-floating equilibrium condition, the sensing means sensing vertical displacement of the dead weight piston assembly through the equilibrium zone and an elastic stop zone in which the elastic stop assembly is elastically deformed by vertical displacement of the dead weight piston assembly, means for producing a proportional control signal indicative of the piston position relative to the elastic stop zone, and means responsive to the proportional control signal for reducing a rate of pressure change of fluid supplied by the fluid source as the piston moves toward the equilibrium zone so as to rapidly stabilize the piston in the equilibrium zone without pressure overshoot.

4. The dead weight piston pressure measurement device of claim 3 wherein the fluid source is a computer controlled fluid source including a controller responsive to the proportional control signal to control the rate of pressure increase or decrease of fluid from the computer controlled fluid source.

5. The dead weight piston pressure measurement device of claim 4 including a hollow housing supported by the piston, the housing having a cylindrical portion surrounding the cylinder, a horizontal annular flange being attached to an outer surface of the housing, the calibration weights being annular and stackable on the annular flange in concentric symmetrical relationship to the housing.

6. The dead weight piston pressure measurement device of claim 5 wherein the fluid source includes a precision computer controlled gas source and the controller supplies the proportional control signal to the computer controlled gas source to modify the rate of change of pressure of gas supplied to the volume by the computer controlled gas source.

7. The dead weight piston pressure measurement device of claim 5 wherein the first, second, and third idle wheels are supported on a shift plate that is rotatable to cause inward movement of the first, second, and third idle wheels to effectuate the inward displacement of the first belt to engage the cylindrical drive surface.

8. The dead weight piston pressure measurement device of claim 3 wherein the elastic stop assembly includes a first group of springs symmetrically disposed about a rotation axis of the dead weight piston assembly and carried in a spring carrier attached in fixed coaxial relation with the piston and a second group of springs opposed to the first group of springs and symmetrically disposed about the rotation axis and carried in the spring carrier, the first and second groups of springs elastically biasing the dead weight piston assembly upward in first and second elastic zones on opposite sides of the equilibrium zone.

9. The dead weight piston pressure measurement device of claim 8 wherein upward movement of the spring carrier is limited by a surface of a stationary retaining element within with the spring carrier slides, a volume between that surface and the spring carrier trapping fluid and acting to dampen rapid movement of the spring carrier relative to the retaining element.

10. The dead weight piston pressure measurement device of claim 1 including a second belt that is supported on the first, second, and third stationary pulleys without touching the cylindrical drive surface when the first, second, and third idle wheels displace the first, second, and third segments of the first belt, respectively.

11. The dead weight piston pressure measurement device of claim 10 wherein the first, second, and third pulleys are supported on a stationary support.

12. The dead weight piston pressure measurement device of claim 11 wherein the cylindrical drive surface is cylindrical and is disposed on an outer portion of the housing.

13. The dead weight piston pressure measurement device of claim 11 wherein the sensing means includes a magnetic sensor disposed in fixed relation to the cylinder and a ferromagnetic ring disposed in fixed relation to the housing, and means responsive to the magnetic sensor for determining the vertical displacement of the dead weight piston assembly relative to the cylinder by measuring movement of the ferromagnetic ring relative to the magnetic sensor.

14. The dead weight piston pressure measurement device of claim 1 including means for sensing the rotation rate of the piston, and means responsive to the rotation rate sensing means for actuating the idle wheel moving means to symmetrically move the idle wheels to cause the first belt to engage and rotate the dead weight piston assembly.

15. The dead weight piston pressure measurement device of claim 14 wherein the idle wheel moving means is coupled to rotate the shift plate.

16. The dead weight piston pressure measurement device of claim 1 including means for providing a signal indicative of when perturbations of the dead weight piston assembly due to engagement of the cylindrical drive surface by the first belt have settled.

17. A method of operating a dead weight piston pressure measurement device including a cylinder and a piston rotatable in the cylinder and vertically moveable in the cylinder, weight supporting means carried by the piston and supporting a plurality of calibration weights, the method comprising the steps of:
(a) initially supporting weight of the piston by means of an elastic movement limiting device;
(b) rapidly forcing fluid from a fluid source into a volume between the cylinder and the piston until the piston begins to rise;
(c) sensing movement of the piston in an elastic movement zone determined by the elastic movement limiting device to produce a control signal;
(d) substantially reducing the rate of flow of fluid between the cylinder and the fluid source as the piston moves in the elastic movement zone; and
(e) actuating a drive mechanism in response to the control signal to rotate the piston, the piston rotating in a free-floating equilibrium zone in the cylinder, lubricated by a thin layer of the fluid between the piston and a wall of the cylinder.

18. The method of claim 17 wherein step (d) includes controlling flow of fluid between the cylinder and the fluid source in response to the control signal to rapidly stabilize the position of the piston in the cylinder in the free-floating equilibrium condition.

19. The method of claim 17 wherein the drive mechanism includes three pulleys rotating in response to the control signal and supporting a drive belt in an equilateral triangle configuration, the belt surrounding but not touching a cylindrical drive surface associated with the piston, the cylindrical drive surface being coaxial with the piston, the method including symmetrically moving three idle wheels against three segments, respectively, of the belt causing it to engage three points, 120 degrees apart, of the cylindrical drive surface, to thereby rotate the piston without producing thereon any sustained radial or vertical displacement forces that interfere with the accuracy of a pressure measurement of fluid in the cylinder under the piston.

20. The method of claim 17 including sensing the rotation rate of the piston and controlling the speed of the rotation of the piston and the timed engagement of the belt with the cylindrical drive surface to accelerate the rotation rate to an upper limit.

21. The method of claim 20 including providing a ready signal indicative of when the pressure of fluid in the cylinder under the piston is free of perturbations caused by the engagement of the belt with the cylindrical drive surface.

22. A dead weight cylinder pressure measurement device, comprising in combination:
(a) a piston;
(b) a cylinder rotatable about the piston, and vertically moveable about the piston, the cylinder supporting a plurality of calibration weights and a cylindrical drive surface coaxial with the cylinder;
(c) an external fluid source coupled to supply a flow of fluid, the pressure of which is to be measured, into or out of a volume between the cylinder and the piston to vertically move the cylinder about the piston, the combined weight of a dead weight cylinder assembly including the cylinder and the calibration weights accurately indicating the pressure of the gas in the volume when the cylinder is rotating in a free-floating equilibrium condition about the piston;
(d) a drive mechanism for rotating the cylinder, including
  i. first, second, and third stationary pulleys supporting a belt in an equilateral triangle configuration, midpoints of first, second, and third segments of the belt nearly touching first, second, and third points of the cylindrical drive surface,
  ii. drive means for rotating the first pulley, thereby rotating the belt and thereby rotating the second and third pulleys, iii. first, second, and third moveable idle wheels symmetrically disposed adjacent to the first, second, and third segments of the belt, and iv. means for moving the first, second, and third idle wheels against the first, second, and third segments of the belt, respectively, displacing them inwardly to symmetrically engage three points of the cylindrical drive surface, respectively, causing the dead weight cylinder assembly to rotate without producing thereon any sustained vertical or radial displacement forces.

23. The dead weight cylinder pressure measurement device of claim 22 including a cylindrical chamber within the piston coaxial with a cylindrical outer surface of the piston that mates with the cylinder, and means for metering fluid into the cylindrical chamber to precisely deform the outer surface of the piston to conform to the cylinder so as to optimize operation of the dead weight cylinder measurement device.

24. A dead weight pressure measurement device, comprising in combination:

(a) a first element, having a first cylindrical surface;

(b) a second element, rotatable about the first element, having a second cylindrical surface adjacent to the first cylindrical surface, and vertically moveable about the first element, the second element supporting a plurality of calibration weights and a cylindrical drive surface coaxial with the second cylindrical surface;

(c) an external fluid source coupled to supply a flow of fluid, the pressure of which is to be measured, into or out of a volume between the second element and the first element to vertically move the second element relative to the first element, the combined weight of a dead weight assembly including the second element and the calibration weights accurately indicating the pressure of the gas in the volume when the second element is rotating in a free-floating equilibrium condition about the first element;

(d) a drive mechanism for rotating the second element, including i. first, second, and third stationary pulleys supporting a belt in an equilateral triangle configuration, midpoints of first, second, and third segments of the belt nearly touching first, second, and third points of the cylindrical drive surface, ii. drive means for rotating the first pulley, thereby rotating the belt and thereby rotating the second and third pulleys, iii. first, second, and third moveable idle wheels symmetrically disposed adjacent to the first, second, and third segments of the belt, and iv. means for moving the first, second, and third idle wheels against the first, second, and third segments of the belt, respectively, displacing them inwardly to symmetrically engage three points of the cylindrical drive surface, respectively, causing the dead weight second element assembly to rotate without producing thereon any sustained vertical or radial displacement forces.

* * * * *